3,480,655
DIHYDROXY HYDROCARBYL TIN HALIDES AND THE PREPARATION THEREOF
Anatole Wowk, Rahway, N.J., assignor to M & T Chemicals Inc., New York, N.Y., a corporation of Delaware
No Drawing. Filed Sept. 1, 1967, Ser. No. 664,939
Int. Cl. C07f 7/22; C08f 45/62
U.S. Cl. 260—429.7      10 Claims

ABSTRACT OF THE DISCLOSURE

In accordance with certain of its aspects, this invention comprises novel compounds $RSn(OH)_2X$ wherein R is hydrocarbon and X is halogen; and methods of preparing these novel compounds. The organo-dihydroxy tin halides find utility as stabilizers for resins, fungicides and active additives to anti-fouling paint.

---

This invention relates to the production of organotin compounds. More specifically, it relates to novel organotin compounds and to a process for preparing these compounds.

It is an object of this invention to provide a novel class of organotin compounds and a method of preparing these compounds. Other objects will be apparent to those skilled in the art from inspection of the following description.

In accordance with certain of its aspects, this invention comprises novel compounds $RSn(OH)_2X$ where R is hydrocarbon and X is halogen.

In the compound $RSn(OH)_2X$, X may be halide and preferably halide having an atomic number of at least 17. The preferred halide may be chloride, bromide, and iodide.

In this compound, R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

The novel product of this invention may be prepared from the compound $RSnX_3$.

Typical compounds $RSnX_3$ may include the following:

ethyl tin trichloride
propyl tin trichloride
n-butyl tin trichloride
hexyl tin trichloride
octyl tin trichloride
phenyl tin trichloride
o-tolyl tin trichloride
benzyl tin trichloride
butenyl tin trichloride
ethynyl tin trichloride
butyl tin tribromide
n-octyl tin tribromide Compounds such as butyl tin bromide dichloride may be employed. Preferably the compound $RSnX_3$ may be a chloride; and the preferred compounds may be n-butyl tin trichloride and n-octyl tin trichloride.

In accordance with certain of its aspects, the process for preparing the novel compounds of this invention may include maintaining an aqueous reaction mixture containing $RSnX_3$; adding to said reaction mixture a catalytic amount of a catalyst selected from the group consisting of aluminum chloride, titanium tetrachloride, bismuth trichloride, ferric chloride, cobalt chloride, nickel chloride, cadmium chloride, zirconium tetrachloride, boron trifluoride etherate, mercuric chloride, cupric chloride, trifluoroacetic acid, and zinc fluoride; thereby forming a precipitate containing $RSn(OH)_2X$; and recovering said precipitate from said aqueous reaction mixture.

In practice of this aspect of the invention, 10–200 parts, say 17.5 parts of $RSnX_3$ may be added to 100 parts of aqueous reaction medium, preferably water. Catalyst, preferably aluminum chloride, may be added in amount of 0.1–10 parts, say 0.95 part, and the solution allowed to stand for up to 2–3 hours. The solid precipitate which forms may be separated as by filtration and washed with 10–1,000 parts, say 15 parts of water. After further washing with 6–60 parts, say 12 parts of e.g. acetone, the precipitate may be air-dried. The product, typically obtained in amount of 2.5 parts, may be recovered from the filtrate.

In accordance with another aspect, the process for preparing the novel compounds of this invention by the reaction $RSnX_3 + 2OH^- \rightarrow RSn(OH)_2X + 2X^-$ may include maintaining an aqueous reaction mixture containing $RSnX_3$; adding to said aqueous reaction mixture base in amount not stoichiometrically greater than the amount of $RSnX_3$ thereby forming a precipitate containing $RSn(OH)_2X$; and recovering said precipitate from said aqueous reaction mixture.

In practice of this aspect of the invention, 10–100 parts, say 20 parts of $RSnX_3$ may be added to 100 parts of aqueous reaction medium, preferably water. Base, preferably an alkali metal hydroxide such as potassium hydroxide, sodium hydroxide may be added thereto preferably as a solution containing 1–50 parts, say 10 parts of base in 100 parts of water. The amount of base added should not be stoichiometrically greater than, and preferably equal to, the amount of $RSnX_3$, i.e. two equivalents of base per mole of $RSnX_3$. The product $RSn(OH)_2X$ may precipitate and, preferably after standing for 4–12 hours be separated as by filtration. The precipitate may be washed with 50–500 parts, say 200 parts of water (which has been acidified preferably with hydrochloric acid) to pH of preferably about 2.0. The product may then be dried.

In accordance with another of its aspects, the process of this invention for preparing $RSn(OH)_2X$ when R is alkyl may include maintaining an aqueous reaction mixture containing $RSnX_3$; heating said reaction mixture thereby forming a precipitate containing $RSn(OH)_2X$ product; and recovering said precipitate from said aqueous reaction medium.

In practice of this aspect of the invention, 1–40 parts, say 4 parts of $RSnX_3$ may be added to 100 parts of aqueous reaction medium preferably water. The reaction mixture may then be heated to 70° C.–120° C., preferably to reflux temperature of 105° C. for 1–5 hours, preferably 2 hours. The product $RSn(OH)_2X$ may copiously precipitate and be recovered by filtration. The precipitate may be washed with 2–10 parts, say 5 parts of water (which preferably has been acidified preferably with hydrochloric acid to pH of preferably 2.4). The product may be further washed with acetone (acidified to pH of 2.4) and air dried.

The novel product so prepared may have the formula $RSn(OH)_2X$. Typical specific products which may be obtained may be the following:

ethyl tin chloride dihydroxide
propyl tin chloride dihydroxide
n-butyl tin chloride dihydroxide
iso-butyl tin chloride dihydroxide
hexyl tin chloride dihydroxide
octyl tin chloride dihydroxide
phenyl tin chloride dihydroxide
o-tolyl tin chloride dihydroxide
benzyl tin chloride dihydroxide
butenyl tin chloride dihydroxide
ethynyl tin chloride dihydroxide These novel compounds may generally be white, odorless solids, insoluble in water, but soluble in many polar solvents. Many of these compounds melt (with decomposition) at temperatures higher than about 100° C.

These novel compounds may be used as stabilizers for resins, wherein they may prevent deterioration under the undesirable influence of heat and light; and they may be used as fungicides. They also possess activity as additives to anti-fouling paint.

They may also be used to prepare a wide variety of other organo-metallic compounds. The presence of hydroxy groups and halide groups makes it possible to react one or the other types of groups to produce desired products.

The following examples are submitted for the purpose of illustration only and are not to be construed as limiting the scope of the invention in any way.

EXAMPLE 1

In accordance with one aspect of the invention, butyltin chloride dihydroxide may be prepared by adding 500 parts of butyltin trichloride to 2,500 parts of cold water with agitation, during which time the temperature may rise from 24° C. to 35° C. Impurities may be separated by filtration and the crystal clear colorless solution titrated with 1,135 parts of 10% aqueous sodium hydroxide solution. During the course of titration (75 minutes) pH rose from 0.7 to 1.4 as butyltin chloride dihydroxide forms and precipitates.

The suspension may be filtered, the filter cake may then be washed with a mixture of 4,000 parts of water, 800 parts of acetone, and 11 parts of concentrated hydrochloric acid. The washed product may be dried at 50° C.–60° C. 380 parts of white amorphous solid (87.5% yield) was obtained. Analysis of the product indicated the following:

| Percent | Calc. | Found |
|---|---|---|
| Sn | 48.39 | 48.44 |
| Cl | 14.45 | 14.31 |
| O | 19.59 | 19.90 |
| Cl/Sn atomic ratio | 1.00 | 0.99 |
| Assay by nonaqueous titration | 100 | 101.4 |

Product may be found to have a melting point which varies upon the rate of heating. Decomposition with vapor evolution is noted and the melting point appears to be in the range of 140° C.–150° C.

EXAMPLE 2

Butyltin chloride dihydroxide may be prepared by dissolving 15.1 parts butyltin trichloride in 660 parts of cold water, filtering off the impurities, and refluxing the filtrate for 2 hours while stirring the solution rapidly. The copious white precipitate formed may be filtered off, washed with a mixture of 80 parts water and 16 parts acetone previously acidified with hydrochloric acid to pH 2.4, and dried at 45° C.–55° C.

White amorphous product thus obtained (5.3 parts, 41.3% yield) has the following analysis:

| Percent | Calc. | Found |
|---|---|---|
| Sn | 48.39 | 48.25 |
| Cl | 14.45 | 14.37 |
| Assay by nonaqueous titration | 100 | 102 |

EXAMPLE 3

30 parts of butyltin trichloride was dissolved in 170 parts of water and filtered from a small amount of impurities. Clear filtrate was treated with 1.6 parts of aluminum chloride, the solution was allowed to stand. After 2–3 hours a precipitate started to form. After standing for several hours solid was filtered off, washed with 25 parts of water followed by 20 parts of acetone, air dried. 4.2 parts of butyltin chloride dihydroxide was obtained and filtrate had pH of 0.9.

Filtrate, combined with washings, on standing for two days gave a second crop of the product, viz. 2.9 parts. Total yield corresponds to 27% theory.

Analytical data:

| | Percent Sn | Percent Cl | Acid No. |
|---|---|---|---|
| Crop I | 47.66 | 14.86 | 227 |
| Crop II | 47.94 | 14.96 | |
| Calculated | 48.39 | 14.45 | 229 |

EXAMPLE 4

10 parts of octyltin trichloride was dissolved by washing in 40 parts water and 50 parts acetone. The solution was titrated with 19.5 parts of 11% sodium hydroxide raising pH of solution from 0.9 to 2.1 and precipitating the product. After stirirng for 4 hours and standing overnight, the white amorphous solid was filtered off, washed with 50 parts water previously acidified to pH 2.0 with hydrochloric acid, and dried at 45° C.–50° C.

Octyltin chloride dihydroxide obtained (8.0 parts, 90% yield) had the following analysis:

| Percent | Calc. | Found |
|---|---|---|
| Sn | 39.38 | 39.58 |
| Cl | 12.01 | 11.76 |
| Assay by nonaqueous titration | 100 | 100 |

EXAMPLE 5

31.5 parts of phenyltin trichloride was dissolved in 114 parts of water and filtered from a small amount of impurities. Solid sodium bicarbonate (13.1 parts) was added in increments to the rapidly stirred solution over a 70 min. period. A white solid precipitated while pH rose from 0.4 to 0.7. After stirring the slurry for 45 min. the solid was filtered off, washed on filter with 50 parts water previously acidified to pH 1.0, and air dried.

Phenyltin chloride dihydroxide (5.8 parts, 21% theory) had analysis:

| Percent | Calc. | Found |
|---|---|---|
| Sn | 44.75 | 43.67 |
| Cl | 13.36 | 13.22 |
| Assay by nonaqueous titration | 100 | 100.5 |

The product is insoluble in water and hexane, soluble in acetone.

From the filtrate and washing of the above product a second crop of the product was obtained (5.9 parts) by raising pH of solution from 0.9 to 1.2 by addition of solid ammonium chloride, filtering off the formed solid, and washing it with 40 parts of water previously acidified to pH 1.0 with conc. hydrochloric acid.

Although this invention has been disclosed by reference to various specific examples, it will be apparent to those skilled in the art that various modifications and changes may be made thereto which fall within the scope of this invention.

I claim:

1. The compound $RSn(OH)_2X$ wherein R is a hydrocarbon radical selected from the group consisting of alkyl, alkenyl, cycloalkyl, aralkyl, aryl, and alkaryl and X is halide.
2. The compound claimed in claim 1 wherein R is alkyl.
3. The compound claimed in claim 1 wherein R is butyl.
4. The compound claimed in claim 1 wherein R is octyl.
5. The compound claimed in claim 1 wherein X is chloride.
6. The compound claimed in claim 1 wherein said compound is butyltin dihydroxide chloride.
7. The compound claimed in claim 1 wherein said compound is octyltin dihydroxide chloride.
8. The process for preparing $RSn(OH)_2X$ wherein R is hydrocarbon and X is halide which comprises maintaining an aqueous reaction mixture containing $RSnX_3$; adding to said reaction mixture a catalytic amount of a catalyst selected from the group consisting of aluminum chloride, titanium tetrachloride, ferric chloride, cobalt chloride, nickel chloride, cadmium chloride, zirconium tetrachloride, boron trifluoride etherate, mercuric chloride, cupric chloride, trifluoroacetic acid, and zinc fluoride; thereby forming a precipitate containing $$RSn(OH)_2X$$

and recovering said precipitate from said aqueous reaction mixture.

9. The process for preparing $RSn(OH)_2X$ wherein R is hydrocarbon and X is halide which comprises maintaining an aqueous reaction mixture containing $RSnX_3$; adding to said aqueous reaction mixture base in amount not stoichiometrically greater than the amount of $RSnX_3$ thereby forming a precipitate containing $RSn(OH)_2X$; and recovering said precipitate from said aqueous reaction mixture.

10. The process for preparing $RSn(OH)_2X$ wherein R is hydrocarbon and X is halide which comprises maintaining an aqueous reaction mixture containing $RSnX_3$; heating said reaction mixture thereby forming a precipitate containing $RSn(OH)_2X$ product; and recovering said precipitate from said aqueous reaction medium.

References Cited

FOREIGN PATENTS 100,000   12/1961   Netherlands.

TOBIAS E. LEVOW, Primary Examiner
W. F. W. BELLAMY, Assistant Examiner

U.S. Cl. X.R.

106—15; 260—45.75, 999